United States Patent Office 3,203,976
Patented Aug. 31, 1965

3,203,976
DIHYDROXY ALKYL BIS - (2 - CYANOETHYL) AMINES AND PROCESSES FOR THE PREPARATION THEREOF
Adolph E. Oberth, Fairoaks, and Rolf S. Bruenner, Orangevale, Calif., assignors to Aerojet-General Corporation, Azusa, Calif., a corporation of Ohio
No Drawing. Filed Jan. 24, 1963, Ser. No. 254,857
19 Claims. (Cl. 260—465.5)

This invention relates to novel compounds and methods employed for their manufacture. Further, this invention relates to novel compounds which are useful as additives to polymeric compositions.

In the formulation and use of polymeric compositions, it is frequently necessary to incorporate large amounts of filler materials into the polymer. These filler materials can be required for various reasons such as, for example, to impart structural rigidity to the plastic article. Polymers containing high quantities of filler material have the disadvantage of becoming brittle and structurally weak. This has constituted a major problem in the use of highly filled polymeric materials.

An object of our invention is to provide novel compounds which when incorporated in a polymer containing a relatively high quantity of filler material greatly improve the strength of the polymer over a wide temperature range. A further object is to provide methods for making the aforesaid compound.

The objects of this invention are accomplished by providing compounds having the formula

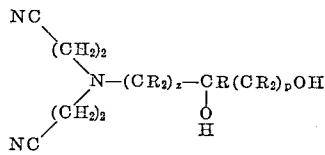

in which the various R groups, which can be the same or different, are selected from the group consisting of hydrogen and lower alkyl groups having 1 to about 6 carbon atoms, $z$ and $p$ are positive whole integers ranging from 1 to about 6 and the molecular weight of our compounds ranges from about 198 to about 1000. Preferably, $z$ and $p$ are each one. More preferably, $z$ and $p$ are each 1 and and each of the R groups in the above formula is hydrogen. In this preferred case, the compound represented by the above formula is 2,3-dihydroxypropyl bis-(2-cyanoethyl) amine. This compound has been found to be a most excellent additive to highly filled polymer compositions which are to be subjected to a wide range of temperatures. Its use greatly improves the strength and elasticity of the polymer at all temperatures and thereby enables the use of such polymeric compositions in a way heretofore found impossible.

Our compounds, as defined above, can be prepared by either of several novel methods. The first of these methods is illustrated by the following general equation:

(I)

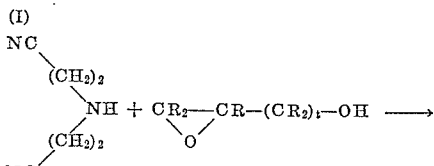

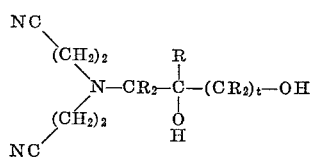

in which $t$ is one or two and R, as set forth previously, is selected from the group consisting of hydrogen and lower alkyl groups containing from one to about 6 carbon atoms. The above process is generally carried out at a temperature between about 70 and about 120° C. although higher temperatures can also be employed. If desired, the process can be carried out in the presence of an unreactive non-aqueous polar solvent such as a cetonitrile, dimethylformamide, dioxane, and the like. Preferably, the above process is carried out with agitation of the reaction mixture so as to ensure intimate contact of the reactants. The process can be carried out at elevated pressures if desired; however, we prefer to conduct the process at atmospheric pressure.

An advantage of our above process is the fact that it produces the product in almost quantitative yield and essentially free from any contaminating by-products such as water. Water is difficult to separate from our products since both they and water are polar. In certain use applications, e.g., when employed as propellant additives, our compounds must be in a very pure state. The above process produces our compounds in such a pure state and eliminates the need for costly and time consuming purification procedures.

When our process (I) is carried out in the presence of a solvent, the product is readily separated from the reaction mixture by conventional means such as removing the solvent by vacuum distillation. Since our process produces the product in almost quantitative yield, we customarily employ stoichiometric quantities of the reactants.

A further method for producing our compounds is set forth in the following general reaction equation:

(II)

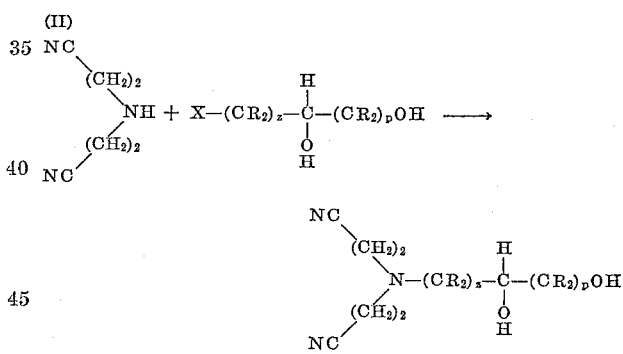

In the above reaction, $z$, $p$ and R have the meaning as set forth previously and X is a halogen having an atomic weight in excess of 35, i.e., chlorine, bromine, and iodine.

The above process (II) is carried out in the presence of a non-aqueous metal-containing base such as sodium acetate, sodium borate, and magnesium oxide. Preferably, the reaction is carried out under mild conditions of temperature, i.e., less than about 50° C. This is not a critical limitation, however, since higher temperatures can be employed if the base is a weak base such as potassium carbonate. The process can be conducted at elevated pressures; however, it is generally conducted at atmospheric pressure.

Although not necessary, our process (II) can be carried out in the presence of a non-reactive polar solvent such as acetone, chlorobenzene, nitrobenzene, dimethylsulfoxide, acetonitrile and the like. Neither the non-aqueous base nor the solvent can be an amine since amines react to give undesired by-products. Our products are separated from the reaction mixture by conventional means such as vacuum distillation. The reactants are generally employed in stoichiometric quantities.

Still another method for forming our novel compounds is illustrated by the following general equation:

(III) (a)

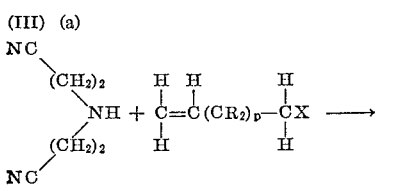

(b)

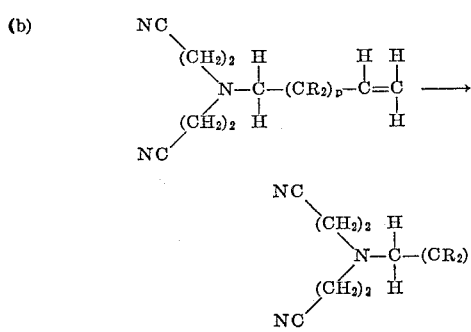

In the above Equations R, p and X have the meaning set forth previously. In Equation IIIa, it is preferable to employ a slight excess of the olefinic reactant, e.g., five percent molar excess. The product of Reaction IIIa can be separated from the reaction mixture by conventional means such as removal of the solvent, unreacted olefinic materials, acid, etc., by distillation, or extraction of the product from the unreacted olefin, solvent, etc.

In Reaction IIIb, the olefinic amine product of Reaction IIIa is epoxidized and hydrolyzed in a conventional manner. It is not necessary to perform the epoxidation and hydrolysis reactions in a step-wise manner. Proper choice of reaction conditions allows carrying out both reactions concurrently.

The epoxidation reaction is carried out by reacting an epoxidizing agent such as hydrogen peroxide, peracetic acid, perbenzoic acid and the like, with the olefinic amine product of Reaction IIIa. This reaction is carried out in the presence of an unreactive solvent such as dioxane, methylene chloride, water, acetone and the like. The solvent is employed in large quantity, e.g., five moles of solvent per mole of olefinic amine. The epoxidizing agent is generally employed in a stoichiometric amount or in slight excess.

In order to form the glycol from the epoxide, sulfuric acid is added to the system. Since we prefer to carry out the epoxidation and hydrolysis reactions concurrently, the acid is preferably added to the system at the same time the epoxidizing agent is added. However, if it is desired to perform the epoxidizing and hydrolysis reactions in a step-wise manner, the sulfuric acid can be added after the epoxidation reaction has been completed. A large excess of sulfuric acid is employed such as five moles of sulfuric acid per mole of amine reactant. The sulfuric acid is employed in aqueous solution—generally about a 50% aqueous solution.

After hydrolysis of the epoxide has been completed, any excess epoxidizing agent is destroyed by adding a small quantity of a reducing agent such as sodium bisulfite to the system.

The product from Reaction IIIb is separated from the reaction system by conventional means such as vacuum distillation to remove any organic solvent, followed by neutralization of the system (e.g., adding sodium carbonate), and extraction of the amine product with a suitable polar solvent such as chloroform.

Recovery of the product from the extract can be accomplished by removing the solvent in vacuo. Preferably, Reactions IIIa and IIIb are carried out with agitation of the reaction mixture.

Reaction IIIa is carried out at convenient temperatures such as about 80 to about 90° C. depending upon the reaction rate desired. Preferably Reaction IIIa is carried out in the presence of an inert atmosphere such as nitrogen, argon and the like. Reaction IIIb is carried out from about 0 to about 20° C., and preferably from about 0 to about 10° C. When Reaction IIIb is carried out in a step-wise manner, the epoxidation step is carried out at about 0 to about 10° C. and the hydrolysis step is carried out at a higher temperature up to about room temperature.

In order to further illustrate our novel compounds and the processes used in their production, there are presented the following examples in which all parts and percentages are by weight unless otherwise indicated.

*Example I*

To a vacuum type reaction vessel equipped with an agitator, a thermometer, and an addition funnel, were added fifteen moles of $\beta,\beta'$-iminodipropionitrile. The reaction vessel was then subjected to a pressure of about 1 mm. of mercury until the $\beta,\beta'$-iminodipropionitrile had been degassed at room temperature. The reaction vessel was then heated to 115–120° C. with stirring of its contents under atmospheric pressure. When the temperature reached 115–120° C., 30 gms. of 2,3-dihydroxypropyl bis-(2-cyanoethyl) amine were added. Heating was then discontinued and 15 moles of glycidol were added gradually. After addition of approximately 200 ml. of glycidol (2,3-epoxypropanol) through the addition funnel, the temperature of the reaction mixture decreased to approximately 105° C. An exothermic reaction then began as evidenced by a temperature rise in the reaction mixture. The remainder of the glycidol was added slowly so as to maintain the temperature between 105 and 115° C. After all of the glycidol had been added, the temperature of the reaction mixture was allowed to increase to about 120° C. and was maintained at this temperature for 15 minutes to bring about complete reaction of the ingredients. After the temperature had dropped to 100° C., the reaction vessel was subjected to a pressure of 1 mm. of mercury so as to remove unreacted glycidol and any minor quantities of decomposition products such as acrylonitrile. The degassing was accomplished without additional heating and had been completed when the temperature dropped to about 60° C. The yield of 2,3-dihydroxypropyl bis-(2-cyanoethyl) amine was approximately quantitative. The product had a hydroxyl number of 570±30 as measured by the pyridine-phthalic anhydride method. The theoretical hydroxyl number for this compound is 570. The 2,3-dihydroxypropyl bis-(2-cyanoethyl) amine originally present (30 gms.) was found to have a slight catalytic effect on the reaction.

When the reaction of Example I is repeated in the presence of acetonitrile, dimethylformamide or dioxane solvent, the product 2,3-dihydroxypropyl bis-(2-cyanoethyl) amine is, in each case, obtained in good yield.

*Example II*

To one mole of $\beta,\beta'$-iminodipropionitrile is slowly added one mole of 3,4-epoxybutanol. After addition of the 3,4-epoxybutanol, the reaction mixture is maintained at 170° with stirring until reaction is completed. The compound 3,4-dihydroxybutyl bis-(2-cyanoethyl) amine is obtained.

*Example III*

To one mole of $\beta,\beta'$-iminodipropionitrile in a reaction vessel is added one mole of 1-chloro-2,3-dihydroxypropane and one mole of potassium carbonate in acetonitrile solution. The reaction mixture is heated at reflux with stirring until the reaction is completed. The reaction mixture is then filtered to remove solids and the filtrate is heated in vacuo to remove solvent, etc., to give the compound 2,3-dihydroxypropyl bis-(2-cyanoethyl) amine.

*Example IV*

To one mole of $\beta,\beta'$-iminodipropionitrile is added one mole of 6-bromo-1,2-dihydroxyhexane in ethanol solution. The reaction mixture is heated at reflux with agitation for two hours after which there is added one-half mole of potassium carbonate. The reaction mixture is then filtered and the filtrate is heated in vacuo to evaporate the ethanol solvent, etc. There is obtained the compound 5,6-dihydroxyhexyl bis(2-cyanoethyl) amine.

*Example V*

To one mole of β,β'-iminodipropionitrile is added one mole of 8-bromo-1,2-dihydroxyoctane in dimethylformamide solution. After heating for three hours at 100° C. with agitation, one-half mole of potassium carbonate is added to the reaction mixture. The reaction mixture is then filtered and the filtrate is evaporated in vacuo to give the compound 7,8-dihydroxyoctyl bis-(2 - cyanoethyl) amine.

*Example VI*

To one mole of β,β'-iminodipropionitrile is added 1.1 moles of allylchloride and 1 mole of potassium carbonate in dimethyl formamide solution. The reaction mixture is heated with agitation at 85° C. for four hours under nitrogen. The reaction mixture is then filtered. To the filtrate is added 1.05 moles of hydrogen peroxide in 30% concentration along with an additional 5 moles of dimethyl formamide. The reaction mixture is maintained at 0° C. with agitation for two hours after which 5 moles of sulfuric acid of 50% concentration is added. The reaction mixture is then maintained at 20° C. for two hours after which it is neutralized with sodium carbonate. At this point, a 0.25 mole of sodium bisulfite is added. The solvent, etc., is removed by heating in vacuo and the residue is extracted with chloroform and the chloroform extract is heated in vacuo to give the compound 2,3-dihydroxypropyl bis-(2-cyanoethyl) amine.

*Example VII*

To one mole of β,β'-iminodipropionitrile is added 1.1 moles of 5-chloro-1-pentene and 0.55 mole of potassium carbonate. The reaction mixture is heated at reflux for three hours with agitation under nitrogen. To the reaction product is added 1.05 moles of peracetic acid in 20% concentration in acetic acid. The reaction mixture is heated at 15° C. with agitation for two hours. There is then added to the reaction mixture 5 moles of sulfuric acid in 20% concentration. The reaction mixture is neutralized with sodium carbonate and extracted with chloroform. The chloroform extract is heated in vacuo to remove the chloroform and to give the compound 4,5-dihydroxypentyl bis-(2-cyanoethyl) amine.

*Example VIII*

To one mole of β,β'-iminodipropionitrile is added 1 mole of 5-bromo-1,3-dihydroxypentane and one-half mole of potassium carbonate. The reaction mixture is heated at 50° C. with agitation for six hours. Following this, the reaction mixture is filtered to remove solids, and the filtrate is dried in vacuo to give the compound 1,3-dihydroxypentyl bis-(2-cyanoethyl) amine.

*Example IX*

To one mole of β,β'-iminodipropionitrile is added 1 mole of 4-bromo-3-ethyl-1,2-dihydroxybutane, one-half mole of potassium carbonate, and 5 moles of nitrobenzene. The reaction mixture is heated at 80° C. with agitation for eight hours. It is then filtered to remove solids and the filtrate is evaporated in vacuo to give the compound 3-ethyl-3,4-dihydroxybutyl bis-(2-cyanoethyl) amine.

*Example X*

To one mole of β,β'-iminodipropionitrile is added 1 mole of 3-bromomethyl-1-heptene, 1 mole of sodium carbonate, and 5 moles of dimethyl sulfoxide. The reaction mixture is heated at 35° C. with agitation for six hours under nitrogen after which it is filtered to remove solids and the filtrate is heated in vacuo to remove solvent, etc. To the residue is added 1.05 moles of perbenzoic acid, 5 moles of sulfuric acid at 50% concentration, and 5 moles of toluene. The reaction mixture is then maintained at 5° C. with agitation and gradual warming to 35° C. Following reaction completion, the toluene layer is decanted from the aqueous layer which is then neutralized with sodium carbonate. The aqueous layer is extracted with chloroform and heated in vacuo to give the compound 2-butyl-3,4-dihydroxybutyl bis-(2-cyanoethyl) amine.

As shown by the foregoing examples, our invention comprises a number of novel compounds which can be formed by either of three processes which also form a part of our invention. Our compounds are employed as additives to polymeric materials, preferably polyurethanes, which contain in addition large amounts of filler materials. When so employed, our novel compounds are present in an effective amount up to about 25% by weight. Generally, however, our materials are effective at a much lower concentration range such as 5% by weight or less.

Having fully defined our novel compounds, and their various methods of preparation, we desire to be limited only by the lawful scope of the appended claims.

What is claimed is:

1. Compounds having the formula

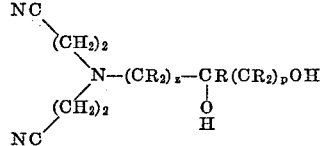

wherein R is selected from the group consisting of hydrogen and lower alkyl, z and p are positive whole integers ranging from 1 to about 6, and the molecular weight of said compounds ranges from about 198 to about 1000.

2. The compounds of claim 1 wherein both z and p are equal to one.

3. The compounds of claim 1 wherein R is hydrogen.

4. 2,3-dihydroxypropyl bis-(2-cyanoethyl) amine.

5. The process comprising reacting β,β'-iminodipropionitrile with a compound having the formula

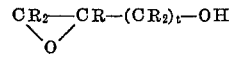

wherein t is selected from the group consisting of 1 and 2, and R is selected from the group consisting of hydrogen and lower alkyl, to produce the compounds having the formula

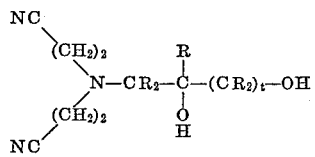

6. The process of claim 1 wherein said process is carried out at a temperature ranging from about 70 to about 120° C.

7. The process of claim 5 wherein said process is carried out in the presence of an unreactive non-aqueous polar solvent.

8. The process comprising reacting β,β'-iminodipropionitrile with glycidol to form the compound 2,3-dihydroxypropyl bis-(2-cyanoethyl) amine.

9. The process of claim 8 wherein the reaction is carried out in the presence of a catalytic quantity of the compound 2,3-dihydroxypropyl bis-(2-cyanoethyl) amine.

10. The process comprising reacting β,β'-iminodipropionitrile with a compound having the formula

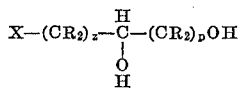

in which X is a halogen having an atomic weight in excess of 35, z and p are positive whole integers ranging from 1 to about 6, and R is selected from the group consisting of hydrogen and lower alkyl, said process being carried out in the presence of a non-aqueous metal-containing base.

11. The process of claim 10 wherein said base is potassium carbonate.

12. The process of claim 11 wherein the reaction is carried out at a temperature less than about 50° C.

13. The process of claim 11 wherein the reaction is carried out in the presence of a non-reactive polar solvent.

14. The process comprising reacting β,β'-iminodipropionitrile with a compound having the formula

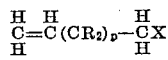

wherein X is a halogen having an atomic weight in excess of 35, p is a positive whole integer ranging from 1 to about 6, and R is selected from the group consisting of hydrogen and lower alkyl, to form a first compound having the formula

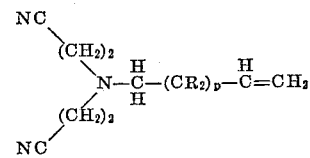

epoxidizing and hydrolyzing said first compound to give the product having the formula

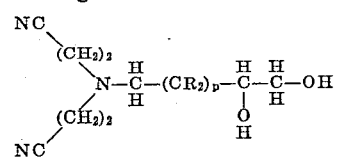

15. 3,4-dihydroxybutyl bis-(2-cyanoethyl) amine.
16. 5,6-dihydroxylhexyl bis-(2-cyanoethyl) amine.
17. 7,8-dihydroxyoctyl bis(2-cyanotheyl) amine.
18. 4,5-dihydroxypentyl bis-(2-cyanoethyl) amine.
19. 1,3-dihydroxypentyl bis-(2-cyanoethyl) amine.

No references cited.

CHARLES B. PARKER, *Primary Examiner.*